United States Patent Office 3,632,791
Patented Jan. 4, 1972

3,632,791
COPOLYMER OF ALKENYL AROMATIC MONO-
MER AND MALEIMIDO REINFORCED WITH
GLASS FIBERS
Walter E. F. Rupprecht and Kenneth J. Guilette, Midland, Mich., assignors to The Dow Chemical Company, Midland, Mich.
No Drawing. Filed Nov. 6, 1968, Ser. No. 773,948
Int. Cl. B32b 5/02, 17/04; C08f 45/10
U.S. Cl. 260—41 AG
5 Claims

ABSTRACT OF THE DISCLOSURE

The invention relates to reinforced or laminated plastic articles comprising reinforcing glass fibers bonded to a copolymer of an alkenyl aromatic monomer having a single aromatic ring and a cyclic imide of an unsaturated dicarboxylic acid. The copolymer has the unique property of self-promoting adhesion between the glass fibers and the copolymer.

BACKGROUND OF THE INVENTION

Fiber glass laminates are in widespread use for such uses as boat hulls, fishing rods, lightweight structural uses, fabrication of automotive parts and the like. Many plastic binders have been proposed for the preparation of such laminates with much interest in using thermosetting plastic resins. Considerable effort has gone into the development of thermosetting resin-glass fiber laminates with much emphasis on methods of improving the bond between the resin and the fiber.

Of considerable interest also, are the laminates prepared with thermoplastic resins, however the problem of adhesion between the resin and fiber limits the use of thermoplastic laminates and is a recuring problem which necessitates the use of special coatings on the fibers and the like. It would be desirable to have a thermoplastic resin capable of self-promoting the adhesion between the resin and glass fibers.

SUMMARY OF THE INVENTION

Accordingly this invention is directed to reinforced or laminated plastic articles comprising reinforcing glass fibers bonded to a copolymer of an alkenyl aromatic monomer having a single aromatic ring and a cyclic imide of an unsaturated dicarboxylic acid. Unexpectedly it has been found that the copolymer has the unique property of self-promoting adhesion between itself and glass fibers.

DETAIL DESCRIPTION OF THE INVENTION

A continual problem with glass laminate articles is the adhesion which can be developed between the resin binder and the fiber. With poor adhesion the laminates do not exhibit their optimum properties such as flexural strength, modulus of elasticity, resistance to solvents, etc.

We have found by using as the resin binder a copolymer of an alkenyl aromatic monomer having a single aromatic ring and a cyclic imide of an unsaturated dicarboxylic acid that the copolymer itself promotes adhesion to glass fibers forming reinforced plastic articles with improved resistance to solvents and retention of physical properties.

The copolymers of this invention are prepared to contain from 5 to about 25 weight percent of said imide with the balance comprising said alkenyl aromatic monomer. The desirable effects of the imide content of the copolymer are also retained when the alkenyl aromatic monomer is partially replaced by a third monomer selected from the group consisting of acrylonitrile, methacrylonitrile, unsaturated dicarboxylic acid anhydrides, acrylic acid, methacrylic acid, and alkyl esters of acrylic acid and methacrylic acid wherein said alkyl group contains from 1 to about 4 carbons. The proportions of the third monomer in the copolymer may range up to 35 weight percent.

Preferably the copolymer contains from 10 to 20 percent of said imide monomer. Higher proportions of the imide monomer may cause processing problems due to increasing the melt viscosity of the copolymer.

Suitable alkenyl aromatic monomers having a single aromatic ring include styrene, vinyl toluene, α-methyl styrene, chlorostyrene and other halogenated styrenes, t-butyl styrene and other similar alkyl substiuted styrenes and the like. Suitable unsaturated dicarboxylic acid cyclic imides include the imides of maleic acid, itaconic acid, citraconic acid and the like. Suitable also are the N-alkyl substituted imides wherein said alkyl group contains from 1 to about 4 carbon atoms. Unsaturated dicarboxylic acid anhydrides which are suitable at a third component of the copolymer include maleic anhydride, itaconic anhydride, citraconic anhydride and the like.

Advantageously, the copolymer may also be prepared by reacting ammonia or an alkyl primary amine having from 1 to abount 4 carbon atoms with a copolymer of an alkenyl aromatic monomer and a dicarboxylic acid anhydride and heating to form the imide. For example, a copolymer of styrene and maleic anhydride may be reacted with ammonia and heated to produce a styrene-maleimide copolymer. When less than a stoichiometric amount of the ammonia or primary amine is used the styrene-maleic anhydride copolymer will retain varying amounts of unreacted anhydride. It can be seen that copolymers may readily be prepared in this manner which correspond to the copolymers previously defined.

Known methods of polymerization by free radical initiation may be used to prepare the copolymers of this invention either directly from the monomers or may be used to prepare an anhydride containing copolymer which is subsequently reacted with ammonia or said amine. Because these methods are well known to the skilled workers no further description is necessary herein.

Reinforcing fiber glass may be combined with the copolymer in a wide range of proportions, but preferably the copolymer is combined with the reinforcing glass fiber in the proportions of about 10 to 35 weight percent glass and the balance to make 100 percent of the copolymer. Higher proportions of glass fiber are dependent on the mixing, blending or fabrication techniques utilized.

By the term reinforcing fiber glass as employed in the appended claims, we include glass cloth of any weave, fibers, mats, roving, strands, chopped strands and the like.

Any of a variety of blending and mixing techniques may be used to intimately admix the reinforcing glass fibers with the copolymer. The mixture may then be molded such as by injection molding, compression molding and the like.

Glass reinforced plastic articles were prepared in a device which combined thin layers of the glass fiber with particulate copolymer solids and which continuously fed the combination to an extruder where the temperature was raised to permit plastic flow and mechanical mixing of the components prior to molding the article under pressure.

Example 1

A copolymer of 85% styrene and 15% maleic anhydried was treated with a sufficient amount of ammonia and heated to convert about 60% of the anhydride groups to the imide (SMI 9). This polymer had a molecular weight of about 120,000. A second copolymer of 82% styrene and 18% maleic anhydride having a molecular weight of about 165,000 was similarly treated to convert about 86% of the anhydride groups to the imide (SMI 15). For comparison purposes a commercial styrene-acrylonitrile thermoplastic (Tyril 767 SAN) was used. Molded articles containing 20% by weight glass were prepared in the above manner and physical properties determined before and after exposure to boiling water (Table I).

TABLE I

|  | SMI 9 | SMI 15 | SAN |
|---|---|---|---|
| Initial tensile, p.s.i. | 11,500 | 10,700 | 14,500 |
| Tensile after 2 hr. water boil | 10,700 | 9,300 | 10,300 |
| Percent loss | 7 | 13 | 29 |

Example 2

Additional exposure tests to different solvents for extended periods of time were run with the molded articles prepared in Example 1.

TABLE II

|  | SMI 15 | SAN |
|---|---|---|
| Initial tensile, p.s.i. | 11,500 | 14,500 |
| After 30 days in motor oil | 11,500 | 13,800 |
| Percent loss | 0 | 5 |
| After 30 days in gasoline | 11,500 | 8,000 |
| Percent loss | 0 | 45 |
| After 30 days in 1% Electrosol, 180° F | 8,800 | 7,400 |
| Percent loss | 24 | 49 |
| After 90 days | 8,400 | (¹) |
| Percent loss | 27 | (¹) |
| After 30 days in 0.5% Tide and 0.5% bleach, 180° F | 8,700 | 6,000 |
| Percent loss | 23 | 59 |
| After 90 days | 6,600 | (¹) |
| Percent loss | 43 | (¹) |

¹ Could not be tested due to chemical attack at interface.

What is claimed is:

1. A plastic article consisting essentially of a glass fiber reinforced copolymer having improved adhesion to the glass fiber; said copolymer consisting of from about 40 to 95 weight percent of an alkenyl aromatic monomer having a single aromatic ring, from about 5 to about 25 weight percent of maleimide, and from 0 to about 35 weight percent of at least one additional monomer selected from the group consisting of acrylonitrile, methacrylonitrile, unsaturated dicarboxylic acid anhydride, acrylic acid, methacrylic acid, and alkyl esters of acrylic and methacrylic acid wherein said alkyl ester group contains from 1 to about 4 carbon atoms.

2. The article of claim 1 comprising from 10 to 35 percent of said fiber glass and from 90 to 65 percent of said polymer.

3. The article of claim 1 wherein said imide comprises from 10 to 20 percent of said copolymer.

4. The article of claim 1 wherein said alkenyl aromatic monomer is styrene.

5. The article of claim 1 wherein said additional monomer is maleic anhydride.

References Cited

UNITED STATES PATENTS

| 3,364,282 | 1/1968 | D'Alelio | 260—883 X |
| 2,342,295 | 2/1944 | Orthner et al. | 260—78 |
| 2,921,928 | 1/1960 | Fields et al. | 260—78 |
| 3,234,042 | 2/1966 | Marzocchi et al. | 117—126 |
| 3,426,228 | 2/1969 | Barrie et al. | 260—78 X |
| 3,429,947 | 2/1969 | Eygen et al. | 260—78 X |
| 3,494,979 | 2/1970 | Pratt | 260—78 |

FOREIGN PATENTS

| 791,663 | 3/1958 | Great Britain | 260—41 |

JOHN T. GOOLKASIAN, Primary Examiner

D. J. FRITSCH, Assistant Examiner

U.S. Cl. X.R.

161—93, 203, 247; 260—78 UA